UNITED STATES PATENT OFFICE.

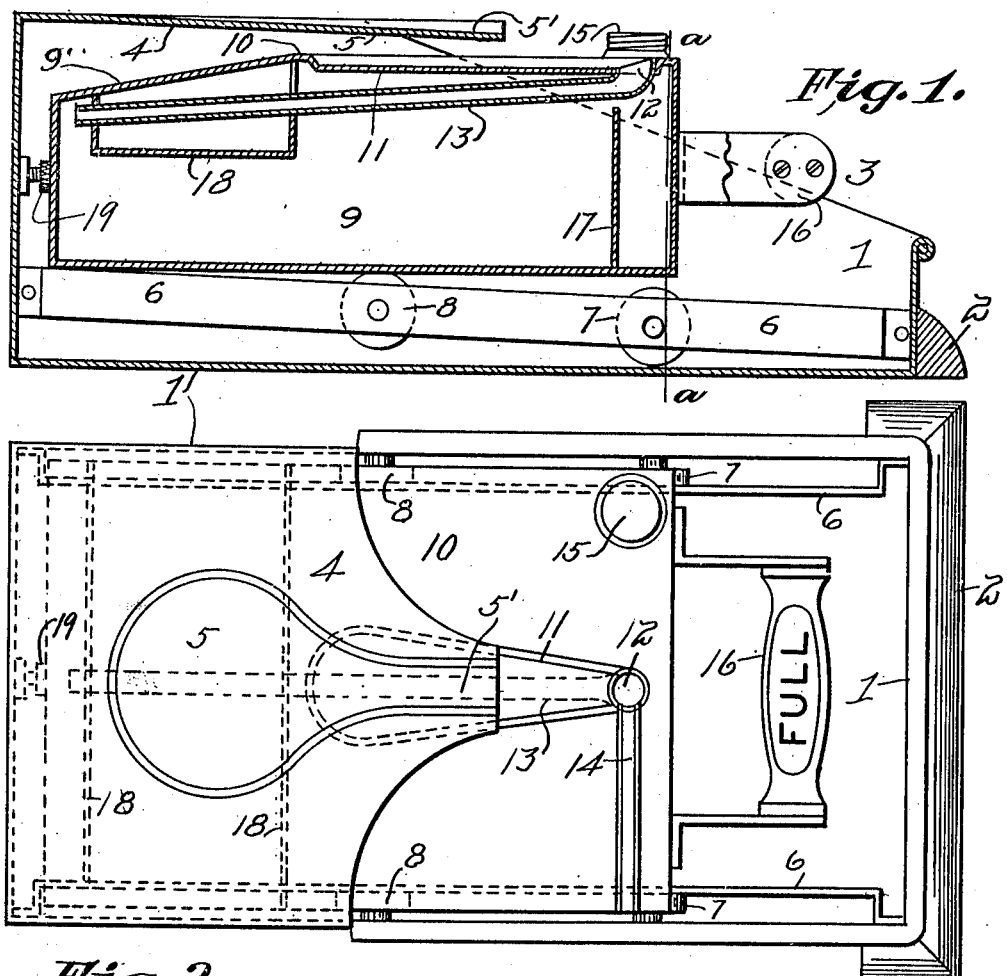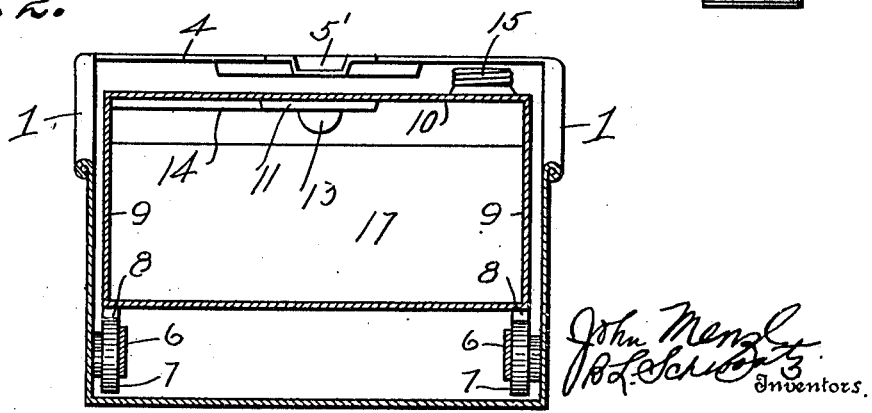

JOHN MENZL AND BERNARD L. SCHWARTZ, OF DAYTON, OHIO.

DRIP-PAN FOR REFRIGERATORS.

949,398.  Specification of Letters Patent.  Patented Feb. 15, 1910.

Application filed February 25, 1909. Serial No. 479,908.

*To all whom it may concern:*

Be it known that we, JOHN MENZL and BERNARD L. SCHWARTZ, citizens of the United States, residing at Dayton, in the county of Montgomery and State of Ohio, have invented certain new and useful Improvements in Drip-Pans for Refrigerators; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in drip pans for refrigerators, and comprises certain novel and useful improvements in the drip pan shown and described in our pending application for Letters Patent filed October 26, 1908, Serial No. 459,508.

The object of the invention is to provide certain structural features which have to do with controlling the drip water as it enters the drip pan, and other incidental features which will hereafter be described and pointed out in the claims.

In the accompanying drawings, Figure 1, is a longitudinal vertical section through the drip pan. Fig. 2, is a top plan view. Fig. 3, is a cross sectional view, on the line *a a* of Fig. 1.

In a detail description of the invention, similar reference characters indicate corresponding parts.

The outer receptacle 1 is in a measure stationary, although not attached to any part which might interfere with its removal when necessary. This outer receptacle is placed under the refrigerator in the rear of a transverse strip 2 which is fastened to the floor about on a line with the front of the refrigerator (not shown). Should it contain any of the drip water, it may be easily removed and such water emptied. In construction, the outer pan 1 is open at its top as at 3 for a considerable distance from the front rearwardly, and the rear portion of the said pan is provided with a top 4 with a suitable depression 5 which extends to the front edge of said top in a narrow or contracted channel as shown at 5′. The main portion of the depression 5 lies right below the drip spout of the refrigerator and catches all of the drip water therefrom; the said depression is surrounded by a suitable marginal flange to prevent any of the water passing from the sides of said depression. On the interior of this main drip pan 1 there are arranged two longitudinal bars 6 which are secured in any suitable manner to the sides of said pan in slanting positions, the highest point of said bars being at the rearward end of the pan. Pivoted to said bars are two pairs of rollers 7 and 8, the rearward pair being arranged a suitable distance rearward of the center of said bars.

9 designates an inner removable drip pan which when in position, normally rests on the inner pair of rollers with the major portion of said pan rearward of said rollers so that the pan will occupy a level position until gravity tilts it forward to engage the forward rollers 7 at which time said inner pan travels to the front end of the pan 1 and exposes itself from under the refrigerator. This feature is substantially the same as in our patent above referred to. The movable drip pan 9 is inclosed by a top 10 which has a depression 11 which receives the drip water from the depression 5 5′ in the top of the outer pan. This depression 11 is shown to extend rearwardly beneath the top of the outer pan as indicated in dotted lines, Fig. 2, and said depression 11 communicates with an opening 12 from whence extends rearwardly on an incline a pipe 13, said pipe delivering the drip water to the rear end of the pan 9.

Extending laterally from the opening 12 is a depression or gutter 14 in the top 10 and beginning at a point below the highest point of the opening 12. This laterally-extending gutter 14 extends to the side edge of the pan 9 and is designed to direct any overflow from the inner pan to the outer pan. This might occur when the emptying of the inner pan is neglected for a time and provides a mere precautionary means to prevent the drip water from passing out of the outside pan. The inner pan in provided with an opening in its top on one side which is closed by a screw cap and provides an outlet for the water in said pan when it is desired to empty the same.

A handle 16 is attached to the front end of the inner pan and affords a convenient means for carrying said pan to the sink to be emptied.

Arranged on the interior of the inner pan at the front, is a transverse wall or dam 17 which terminates a suitable distance from the top of the pan to permit the water to pass thereover to the extreme front end of the pan to tilt said pan to a forwardly and downwardly inclined position when said water rises to a point where it can flow over said wall. The compartment at the front of this wall is therefore filled more or less according to the position of the outer pan, that is—if the outer pan is level or slanting.

Within the inner pan at the rearward end there is placed a transverse block 18 which may be solid or hollow and is attached to the opposite sides of said pan at the top. The inclined tube 13 passes through this member 18 and discharges the water which enters the pan at the extreme inner end of said pan. The object of this block 18 is twofold; it displaces a proportionate amount of water and therefore compels an excess of water to occupy the forward portion of the inner pan, and it also may provide a suitable weight to maintain the pan in a level position until the weight of the water therein tilts said pan on the rollers 8. This member 18 is shown as a part of the same material of which the pan 9 is constructed, but it will be understood as before stated, that said part may be solid in which case, it would be wood.

At the rearward end of the outer pan on the interior thereof, is arranged an adjusting screw 19 by means of which the position of the inner pan relative to the pivot rollers 8 may be determined.

The rearward portion of the top of the inner pan is made to slant rearwardly as at 9' for the purpose of curtailing the interior space of said pan at the rear end. By suitably slanting said rearward part of said pan, it may be made to displace a proper amount of water without employing the water-displacing member 18. It may be further stated, that owing to the outer pan 1 being closed at its top from the rear end to its center, said pan is enabled to be carried suspended from the front and in a manner similar to the inner pan, whenever it contains any water which has dripped therein from the inner pan through the channel 14.

Having now described our invention, we claim:

1. In a drip pan for refrigerators, the combination with an outer pan having a top terminating approximately at a central point and provided with a depression which extends to the extreme forward edge of said top, of an inner movable pan having a top closure provided with a depression which receives the drip water from the depression in the top of the outer pan, the depression in the top of the inner pan extending to an opening in the extreme front edge of said top, and an inclined pipe extending from said opening on the interior of said inner pan and delivering the water to the rearward end of said inner pan, a pair of rollers supporting said inner pan normally in a level position, and a second pair of rollers arranged at the front end of said inner pan and adapted to coöperate with the first named pair of rollers in supporting said inner pan in an inclined position and enabling it to travel forward by gravity to an exposed position.

2. In a drip pan for refrigerators, the combination with an outer pan having a top partially closing said pan and provided with a depression which extends to the front end of said top in a contracted form, of an inner drip pan having its top inclosed by a cover in which there is a depression which receives the drip water from the depression in the top of the outer pan, the depression in the top of the inner pan discharging into an opening in the front portion of said top, an inclined pipe conducting the drip water from said opening rearwardly on the interior of the pan, and means for enabling said inner drip pan to travel to the forward end of the outer pan when the weight of the water in said inner pan tilts it to an inclined position.

3. In a drip pan for refrigerators, the combination with an outer pan having a partly inclosing top with a gutter therein to receive the drip water from a refrigerator, of an inner drip pan having a top provided with a depression to receive the drip water from the depression in the top of the outer pan, the depression in the top of the inner pan discharging into an opening at the front end of said top, an inclined pipe on the interior of said inner pan and extending from said opening to the rearward end of said pan, a transverse division wall located on the interior of said inner pan at the forward end thereof, and two pairs of rollers adapted to support the inner pan and enable it to travel forward when the water therein becomes sufficient to tilt said inner pan to an inclined position on said rollers.

4. In a drip pan for refrigerators, the combination with an outer pan having a partially-inclosing top with a depression therein to receive the drip water from the refrigerator, of an inner drip pan having an inclosing top with a depression therein to receive the water from the top of the outer pan, the depression in the top of the inner pan discharging into an opening in the forward end of said inner pan, a pipe extending from said opening to the rearward end of said inner pan and discharging the water to that end of said inner pan, means for determining the normal position of the inner pan, and two sets of rollers one of which coöperates in supporting said inner pan in a level position, and the other of which coöperates in delivering said pan to an exposed position when it is filled with drip water.

5. In a drip pan for refrigerators, the combination with a drip pan having a dam in its front end over which the water flows to overbalance the pan, and a track down which said pan travels when thus overbalanced by said water.

6. In a device of the character specified, the combination with a drip pan having an overbalancing water compartment in its forward end, of a track upon which said pan travels when overbalanced by the water entering said compartment.

In testimony whereof we affix our signatures, in presence of two witnesses.

JOHN MENZL.
BERNARD L. SCHWARTZ.

Witnesses:
C. M. Theobald,
Matthew Siebler.